3,677,939
PROCESS FOR THE USE OF VERMICULITE IN
WASTE WATER RENOVATION
Arvind S. Patil, 710 Roeder Road, Silver Spring, Md.
20910; John W. Icraus, 3715 Prosperity Ave., Fairfax,
Va. 22030; and Jacob Block, 14112 Parkvale Road,
Rockville, Md. 20852
No Drawing. Original application Mar. 26, 1968, Ser. No.
715,951. Divided and this application Oct. 30, 1970,
Ser. No. 85,719
Int. Cl. B01d 15/00
U.S. Cl. 210—36                    5 Claims

ABSTRACT OF THE DISCLOSURE

Vermiculite, after having been chemically treated, has enhanced absorptive and coagulative properties, and can be used to remove contaminants occurring in waste waters by removing phosphates from the waste water. The treatment consists of (1) expanding the vermiculite and (2) treating the expanded vermiculite with an aqueous solution of an inorganic salt, the cation of which is in a +2 or higher valence state.

---

This is a division of Ser. No. 715,951, filed Mar. 26, 1968, now abandoned.

This invention relates to the use of treated vermiculite to remove contaminants occurring in waste water. In one embodiment of this invention, treating agents for vermiculite are provided which enhance the absorptive and coagulative properties of vermiculite.

Vermiculite has long been known to possess absorptive and coagulative properties when treated with aqueous solutions. However, we have now found that certain chemical agents, when used as treating agents for vermiculite, enhance the normal absorptive characteristics of vermiculite. The treated vermiculite has high efficiency in removal of phosphate and "residual chemical oxygen demand" from waste water.

By the term "residual chemical oxygen demand" is meant the amount of oxygen in p.p.m. required to oxidize the residual organics in waste water. This is measured by treating with dichromate in acid solution, refluxing, and back titrating the remaining dichromate.

The amount of phosphate removal as the $PO_4$ ion is calculated by treating with a molybdate salt solution and aminonaphthol sulfonic acid. The resulting molybdenum phosphate complex is a dark blue in color. Concentration is determined by spectrophotometric comparisons with prepared standards.

In summary, this invention provides a process for treating vermiculite comprising (1) expanding the vermiculite in particle form using a process chosen from the group consisting of thermal expansion and chemical expansion consisting of treating the vermiculite with an aqueous solution of an agent chosen from the group consisting of sodium salts, lithium salts, and N-butylammonium chloride, (2) treating the expanded vermiculite with an aqueous solution of an inorganic salt, the cation of which is in the +2 valence state or higher. In another embodiment of this invention, the expanded vermiculite is treated with an organic material chosen from the group consisting of water soluble salts of a cation selected from the group consisting of the n-butylammonium, iso-butylammonium, 1-methylpropylammonium, n-propylammonium, 1-methylbutylammonium, 2-methylbutylammonium, iso-amylammonium, lithium, lysine and ornithine cations; and a salt of an organic cation selected from the group consisting of n-hexylammonium, n-dodecylammonium, n-octadecylammonium, n-octadecenylammonium, methyloctadecylammonium, dimethyloctadecylammonium, cetyltrimethylammonium, cetylpyridinium, and benzidinium cations; and asphalt.

In a preferred embodiment, this invention relates to a process for treating waste water with the thus-treated vermiculite thereby removing phosphate and residual chemical oxygen demand.

This invention is best described by reference to the following examples:

EXAMPLE 1

Preparation of thermally expanded vermiculite

Vermiculite (150 grams of grade No. 5 from Libbey, Montana) was heated to about 300° C. in a dry atmosphere. Water vapor was driven off and the vermiculite puffed up to an expand exfoliated form.

EXAMPLE 2

Treatment of thermally expanded vermiculite

Portions (25 grams) of the vermiculite prepared in Example 1 were placed in each of five columns having 250 milliliter volume capacity. The vermiculite in each column was treated separately with 500 milliliters of 1 N $AlCl_3$, 1 N HCl, 1 N NaCl, 1 N $CaCl_2$, and the last column with distilled water. The treatment consisted of pouring each of the solutions through the column and allowing the solution to flow through the vermiculite.

After treatment, each column was washed with distilled water until the specific resistance of the effluent was 100,000 ohms. (Distilled water normally has a specific resistance of 400,000 ohms.)

EXAMPLE 3

Removal of phosphate from a synthetic phosphate solution

A synthetic phosphate containing solution (21 parts per million phosphate as $PO_4$) was passed through the five columns prepared in Example 2. The effluent was analyzed for phosphate by the standard molybdate-aminonaphthol sulfonic acid method. The term "bed volume" as used herein means the height in milliliters of the wet vermiculite in the columns. Three bed volumes of solution through the columns were collected. If a treated vermiculite is efficient, it will continue to remove $PO_4$ throughout successive bed volumes. Results are tabulated in Table I.

TABLE I
[$PO_4$ removal from synthetic solution (percent)]

| | B.V. (ml.) | 1st B.V. | 2nd B.V. | 3rd B.V. |
|---|---|---|---|---|
| Column treatment: | | | | |
| $CaCl_2$ | 170 | 88 | 23 | None |
| HCl | 160 | 98 | 34 | None |
| NaCl | 170 | 78 | 8 | None |
| $AlCl_3$ | 135 | 96 | 78 | 39 |
| Control | 130 | 82 | 24 | None |

EXAMPLE 4

Removal of phosphate and chemical oxygen demand from a sanitary waste water

Secondary effluent from a sanitary waste water treatment plant containing 9.25 parts per million phosphate and 30 parts per million chemical oxygen demand was passed through the five columns prepared in Example 2. The effluents were analyzed for $PO_4$ and chemical oxygen demand by standard methods. The method for $PO_4$ analysis was the same as that described above. Chemical oxygen demand (COD) was measured using the standard dichromate process.

As in Example 3, three bed columns of effluent were collected from the columns. Results are tabulated in Table II.

TABLE II

| Column treatment: | PO₄ removal (percent) | | | COD removal (percent) | | |
|---|---|---|---|---|---|---|
| | 1st B.V. | 2nd B.V. | 3rd B.V. | 1st B.V. | 2nd B.V. | 3rd V.V. |
| A. Control | 81.6 | 27.0 | 10.3 | 75 | 3 | 0 |
| B. HCl | 91.9 | 38.4 | 32.4 | 90 | 40 | 22 |
| C. CaCl₂ | 89.2 | 37.8 | 10.8 | 43 | 17 | 0 |
| D. NaCl | 59.4 | 21.1 | 9.9 | 55 | 13 | 0 |
| E. AlCl₃ | 100.0 | 100.0 | 82.0 | 82 | 50 | 8 |

EXAMPLE 5

Chemical exfoliation with NaCl and treatment with aluminum at pH 2

50 grams of vermiculite ore was treated with 2 liters of a 9% NaCl solution with stirring for 20 hours. The vermiculite was then washed with water (10 times). One liter of 1.0 M AlCl₃ solution was added to the vermiculite, and stirred for one hour. The vermiculite was then washed with water and transferred to a column. A secondary waste effluent (22.5 p.p.m. PO₄) was passed through the column and the column effluent was analyzed for PO₄. After the passage of 117 bed volumes, the column no longer removed phosphate. Total phosphate removed to that point was 101 mg. PO₄/50 grams of vermiculite. (See Table III.)

TABLE III

| Number of bed volumes passed: | P.p.m. PO₄ in effluent | Percent PO₄ removed |
|---|---|---|
| 10 | 1.50 | 92 |
| 25 | 2.20 | 90 |
| 45 | 3.95 | 82 |
| 65 | 4.58 | 80 |
| 85 | 16.5 | 27 |
| 105 | 18.5 | 18 |
| 113 | 20.2 | 10 |
| 117 | 22.5 | 0 |

EXAMPLE 6

Phosphate removal capacity of vermiculite treated with Al at pH 3.5

100 grams of vermiculite ore was treated with 200 ml. of 20% NaCl solution, at 50° C. for 20 hours. The vermiculite was then washed with water, and left in water for 20 hours. The vermiculite was filtered and air dried. A 0.33 molar aluminum nitrate solution was prepared by adding dilute NaOH to an AlNO₃ solution, until the pH reached 3.5. The vermiculite was then treated with this solution at 40° C. for 20 hours. The vermiculite was washed with pH 3.5 nitric acid solution, filtered and air dried. One liter of a sodium phosphate solution containing 29 grams of sodium phosphate monobasic was prepared and brought to pH 5 with NaOH. 10 grams of the dried vermiculite was added, and the mixture was left for 5 days. The vermiculite was then removed, washed with methyl alcohol, and analyzed for phosphate. Total phosphate adsorbed by the vermiculite was 884 mg. PO₄/100 grams vermiculite.

In addition to the aluminum, other cations can be employed. Suitable examples are iron (+3), Ca⁺², Ba⁺², and Sr⁺², as well as other large cations which form insoluble phosphates, and have a valence number of +2 or larger.

The anion which is employed with the treating salt can be any common, water soluble anion. We prefer to use the chloride and nitrate anions, however.

When organic materials are used as the treating agents following the first step of chemical expansion, we have found that removal of chemical oxygen demand is very high, and remains at efficient levels after three bed volumes.

The vermiculite to be used in this invention is in the particle size of about −16 to 60, U.S. Screen Size. However, this size is not limiting, since the only actual limitation is the flow rate through the column.

Having fully described this invention, what is claimed is:

1. A process for removing phosphate contaminants from waste water which comprises passing said waste water through a bed of vermiculite, said vermiculite having been pre-treated by expanding the vermiculite followed by treating the expanded vermiculite with an aqueous solution of an inorganic salt, the cation of which is in the +2 valence state or higher and then recovering the phosphate depleted waste water.

2. The process according to claim 1 wherein the vermiculite is expanded thermally by heating to about 300° C. in a dry atmosphere.

3. The process according to claim 1 wherein the vermiculite is expanded chemically by treatment with a solution of a salt selected from the group consisting of sodium chloride, lithium chloride, and N-butylammonium chloride.

4. The process according to claim 1 wherein the inorganic salts are selected from the group consisting of iron (+3), calcium (+2), barium (+2) and aluminum salts.

5. The process according to claim 1 wherein the treating agent is a 1 Normal solution of aluminum chloride adjusted to a pH of 2.0 to 3.5.

References Cited

UNITED STATES PATENTS

| 3,562,154 | 2/1971 | Davis et al. | 210—36 |
| 2,701,792 | 2/1955 | Owen | 210—36 |
| 2,036,258 | 4/1936 | Cummins | 210—36 |
| 3,414,511 | 12/1968 | Hitzman | 210—40 |
| 3,401,114 | 9/1968 | Carlton et al. | 210—40 X |

SAMIH N. ZAHARNA, Primary Examiner

U.S. Cl. X.R.

210—37

UNITED STATES PATENT OFFICE
CERTIFICATE OF CORRECTION

Patent No. 3,677,939    Dated July 18, 1972

Inventor(s) Arvind S. Patil, John W. Kraus, Jacob Block

It is certified that error appears in the above-identified patent and that said Letters Patent are hereby corrected as shown below:

"In Column 1, line 5:

"20910; John W. Icraus, 3715 Prosperity Ave., Fairfax"

should read:

"20910; John W. Kraus, 3715 Prosperity Ave., Fairfax"

Signed and sealed this 31st day of October 1972.

(SEAL)
Attest:

EDWARD M. FLETCHER, JR.
Attesting Officer

ROBERT GOTTSCHALK
Commissioner of Patents